Patented Aug. 30, 1949

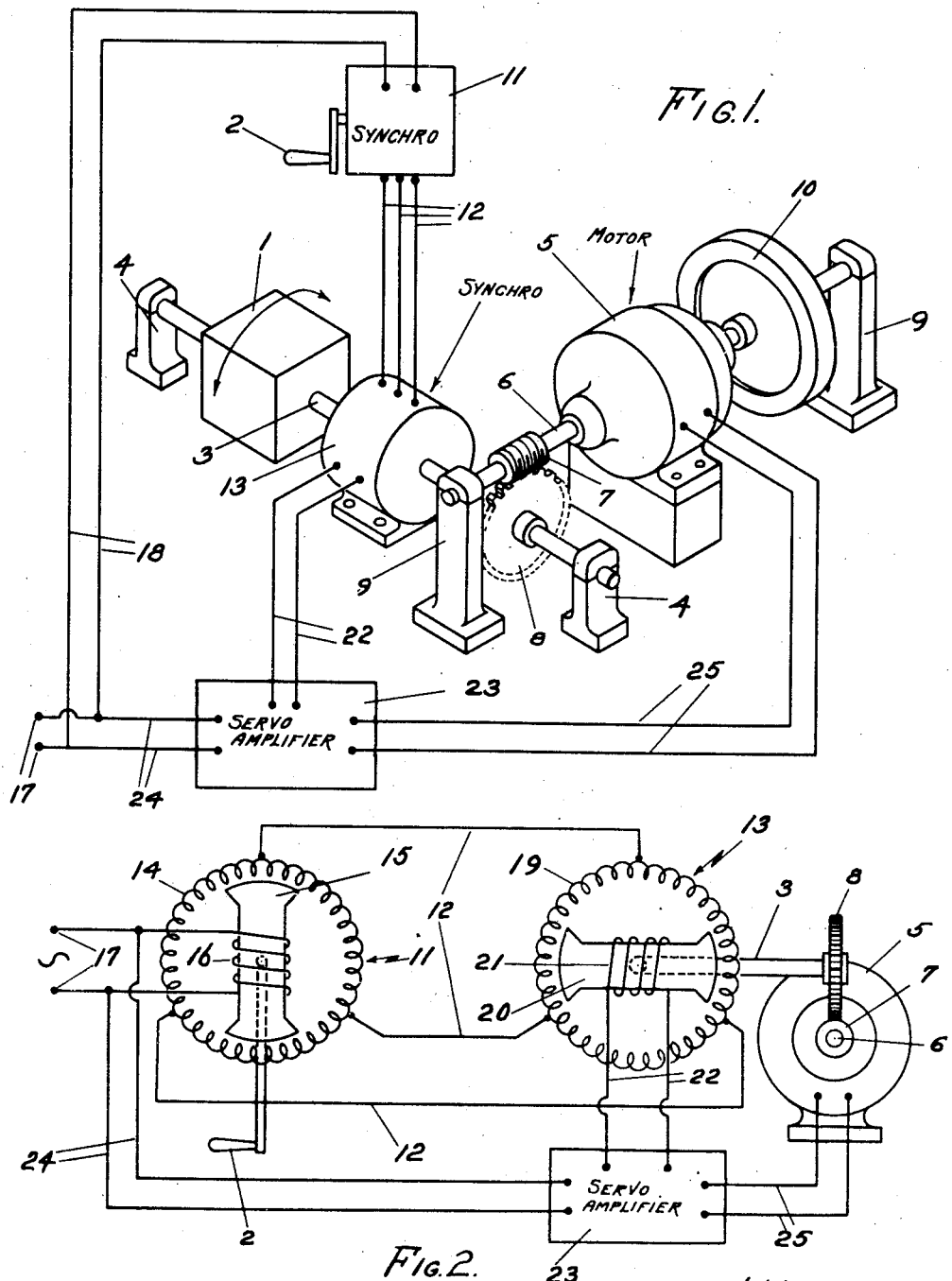

2,480,634

UNITED STATES PATENT OFFICE 2,480,634

GEARED FOLLOW-UP SYSTEM

John W. Dawson, West Newton, Mass., assignor to Raytheon Manufacturing Company, Newton, Mass., a corporation of Delaware Application May 2, 1944, Serial No. 533,765

2 Claims. (Cl. 318—30)

This invention relates to a variable speed driving system in which the driven member has a relatively high inertia and is driven through an irreversible speed reduction gear drive. More particularly this invention relates to such a system in which the driven element is the controlled object of a servo system which has for its purpose the driving of said controlled member to a position of agreement with a controlling member.

Heretofore it has been deemed virtually impossible to utilize systems of this kind since very frequently severe difficulties have been encountered whenever the acceleration of the load became negative. Under these conditions the system has tended to lock with the driven member going into violent oscillations and chattering.

An object of this invention is to devise a variable speed driving system of the follow-up or servo type in which the driven member may be accelerated and decelerated smoothly without any tendency for the system to lock or to be subjected to undesired oscillations.

Another object is to devise a servo system of the above type in which the agreement of positioning between the controlling and the controlled object is secured with diminished delay and greater accuracy.

The foregoing and other objects of this invention will be best understood from the following description of an exemplification thereof, reference being had to the accompanying drawing, wherein:

Fig. 1 is a diagrammatic representation of a system embodying my invention; and

Fig. 2 is a circuit diagram of the electrical elements of Fig. 1.

The system illustrated constitutes a servo system in which a controlled object 1 is to be driven to a position of agreement with a controlling object 2, such as a hand-operated crank. Of course it is to be understood that this crank may be replaced by any movable object, the position of which is to be followed by the controlled object 1. The controlled object 1 has considerable inertia, and is mounted on a shaft 3 which may be supported in suitable bearings 4. The shaft 3 is driven from a reversible variable speed motor 5. This motor has its driving armature mounted on a shaft 6 which drives the shaft 3 through a high-ratio gear-reduction drive consisting, for example, of a worm gear 7 mounted on the shaft 6 driving a spur gear 8 mounted on the shaft 3. The shaft 6 may be mounted in suitable bearings 9. In some instances, as will be described below, it may be desired to mount an additional inertia member 10 on the shaft 6.

In order to secure the necessary servo action, controlling object 2 controls a synchro 11 which feeds a signal corresponding to the position of the controlling object 2 through lines 12 into a synchro 13 associated with the controlled object 1. As illustrated in Fig. 2, the synchro 11 is provided with a closed stator winding 14 carried by a suitable frame member. Said synchro 11 is also provided with an armature 15 actuated by the controlling object 2. The armature 15 is provided with a winding 16 which is supplied with alternating current from a pair of terminals 17 through a pair of leads 18. The terminals 17 are connected to a suitable source of alternating current. Three equally-spaced points on the stator winding 14 are connected by means of the conductors 12 to three similarly equally-spaced points on the stator winding 19 of the synchro 13. Said stator winding 19 is likewise carried by a suitable frame member of the synchro 13. The synchro 13 is also provided with an armature 20 mounted on the shaft 3 which, as already described, is driven by the motor 5 through a suitable reduction gear. The armature 20 is likewise provided with an armature winding 21 which delivers a signal voltage through conductors 22 to a servo amplifier 23 energized through a pair of conductors 24 from the alternating current terminals 17. The servo amplifier delivers a voltage variable in magnitude and direction to a pair of leads 25 which are connected to and energize the motor 5. The torque exerted by the motor 5 will correspond both in magnitude and direction to the voltage delivered to it by the leads 25. The servo amplifier may be of the type as described and claimed in my copending application, Serial No. 509,631, filed November 9, 1943, now Patent No. 2,423,438, dated July 8, 1947, in which the magnitude and direction of the voltage supplied to the leads 25 are dependent upon the magnitude and phase of the controlled voltage supplied by the input conductors 22. Thus it will be seen that the output signal from the synchro 13 will control the speed and direction of rotation of the motor 5. As is well known, the field of the armature 15 will be reproduced by the winding 19 of the synchro 13, and the signal voltage delivered by the leads 22 will be a measure of the deviation from the desired zero position of the armature 20 in which said armature is at right angles to the magnetic field of the winding 19. Under these conditions the servo amplifier 23 will supply current of proper magnitude and polarity to the motor 5 so as to drive the armature 20 and thus the controlled object 1 to their zero position in which they will be in agreement with the controlling object 2.

During operation, the controlling object 2 is moved in accordance with the desired variations to be imparted to the position of the controlled object 1. Thereupon the motor 5 drives the object 1 towards its position of agreement with the controlled object. As said position of agreement is approached, the motor 5 tends to decelerate the controlled object 1. Under these conditions said controlled object, due to its inertia, tends to overhaul the motor 5. Such a condition of overhauling causes the gear drive to pass through substantially its minimum efficiency point. The gears 7 and 8 are intended to be lubricated. When such lubricated gears are operated at a relatively high speed, oil films are built up on the bearing surfaces and the points of contact between the gears, so that under these conditions a relatively high efficiency is obtained. This is the efficiency which is ordinarily considered in a gear drive. However, when operating at a minimum speed approaching zero speed, the lubrication breaks down and the friction forces may be from two to ten times or more as great as when operating at normal speeds. Thus, under the overhauling conditions above described, the relative speeds of the moving gear parts will pass through zero, and therefore the gear efficiency which will be considered in the following analysis will be the gear efficiency at the minimum speed approaching zero speed.

When driving a load having a high inertia through a reduction gear having such a combination of low efficiency and high ratio as to be irreversible, very frequently difficulties have heretofore been encountered whenever the acceleration of the load becomes negative. Under these conditions, with an irreversible gear, the friction developed by the forces acting to retard the rotation of the high inertia load is cumulative, and the system tends to lock and stop instantaneously. This results from the fact that the friction developed by the retarding force is proportional to the inertia and the retardation, so that if the gear is self-locking under one reversed load condition, it is self-locking under any other reversed load condition. The critical condition for self-locking under reversed load is that the efficiency of the reduction gear when driving from the high-speed side to the low-speed side be less than .50. In the present arrangement, therefore, due to the overhauling condition described above, the efficiency of the gear in most instances will be less than the above critical value of .50.

In any practical system, some elasticity will be involved in the shaft, the gear teeth, the bearings, and the supporting elements. Heretofore, when a system involving a self-locking gear with a high inertia load was operated with negative acceleration, in many instances the sequence of events has been somewhat as follows. Upon the application of a retarding torque on the high-speed shaft, the system locks and comes abruptly to rest. The kinetic energy of the inertia load is stored in elastic deformation of the assembly. Thereupon motion of the load is reversed, and the elastically-stored energy is fed back into the kinetic energy of the load. During a brief interval, while travelling through the lost-motion interval, the input shaft is free and advances slightly. Thereupon the output element comes up against the opposite side of the lost-motion interval, and tries to drive the input element in the reverse direction. The locking is then repeated, and the cycle starts over again. The result is a violent oscillation and chattering of the system as the driven member is decelerated. If attempts are made to overcome the above defects by inserting elastic elements in the system, such elastic elements become very large and expensive, and subject the system to considerable error, particularly where servo action is involved, as in the present instance.

In accordance with my invention I have discovered that if the inertia connected to the driving shaft is greater than a critical value, the self-locking tendency disappears and the above defects are completely eliminated. This critical value of input inertia is such that $$\frac{I_1}{I_2} > \frac{1}{\rho^2}\left(\frac{1-2\eta_0}{\eta_0}\right) \quad \text{(Expression 1)}$$

where $I_1$ is the inertia of the input system, $I_2$ is the inertia of the output system, $\rho$ is the ratio of the driving speed to the driven speed, and $\eta_0$ is the efficiency of the gear system at the minimum speed approaching zero speed under sustained load.

As pointed out above, the gear efficiency ordinarily involved in the present system will be less than .50 at any given operating speed, and under these conditions the ratio $$\frac{I_1}{I_2}$$

has a finite value greater than zero. Although for values $\eta_0$ greater than .50 the ratio $$\frac{I_1}{I_2}$$

may be zero, nevertheless I have found it desirable to use some inertia on the input system for efficiencies up to about .60 at any given operating speed.

In many instances sufficient inertia may be included in the driving armature of the motor 5 so as to satisfy Expression 1. However, where this inertia is insufficient for this purpose, the additional inertia element 10 may be used. As pointed out above, it is desirable for maximum accuracy to make the system as stiff as possible. However, some elasticity will inevitably be introduced into the system. The presence of such elasticity introduces complicating factors. However, for a relatively broad range of conditions, I have found that the operation is free from undesirable effects if the stiffness factors as related to the inertias of the system satify the following condition:

$$\sqrt{\frac{K_1}{I_1}} \gg \sqrt{\frac{K_2}{I_2}} \quad \text{(Expression 2)}$$

where $K_1$ and $K_2$ are respectively the stiffness factors for the elastic elements in the input and output systems. The condition of Expression 2 insures against the possibility that the output system can lock before the inertia of the input system takes hold to maintain the motion. If the condition of Expression 2 is met, the motion will be smooth, while if it is not met, the motion may become irregular or oscillatory under decelerating conditions. Since the presence of elasticity in the system is an undesirable condition, it should be understood that in attempting to satisfy Expression 2, the stiffness of the output system should not be decreased but rather the stiffness of the input system should be increased.

If the system, as illustrated in Figs. 1 and 2, is constructed so that the inertia of the input system is greater than the above-described critical value, and if the stiffness factors satisfy the necessary relationship, as called for by Expression 2, the system will operate smoothly and without the difficulties which the art has heretofore encountered.

It is to be understood that this invention is particularly effective in those systems in which the inertia of the output system is so high that although it satisfies the requirements of Expression 1, it nevertheless tends to approach the critical value above which Expression 2 is no longer satisfied. Therefore in Expression 1 the ratio of the inertias is of the order of magnitude of the right-hand side of said expression, although numerically smaller than said right-hand side.

Of course it is to be understood that this invention is not limited to the particular details as described above as many equivalents will suggest themselves to those skilled in the art. It is accordingly desired that the appended claims be given a broad interpretation commensurate with the scope of the invention within the art.

What is claimed is:

1. A follow-up system comprising a controlling member adapted to be moved in accordance with a desired variation, a controlled member, a variable speed driving means for said controlled member, a high ratio speed reduction irreversible mechanism interposed between said driving means and said controlled member, means for causing said driving means to drive said controlled member to a position of agreement with said controlling member, the inertia of tthe output system driven by said mechanism being of the order of and less than $$I_1 \rho^2 \left( \frac{\eta_0}{1 - 2\eta_0} \right)$$

the inertia of the input system feeding into said mechanism being greater than $$\frac{I_2}{\rho^2} \left( \frac{1 - 2\eta_0}{\eta_0} \right)$$

where $I_1$ is the inertia of said input system, $I_2$ is the inertia of said output system, $\rho$ is the ratio of the driving speed to the driven speed of said mechanism, and $\eta_0$ is the efficiency of said mechanism at the minimum speed approaching zero speed under sustained load.

2. A follow-up system comprising a controlling member adapted to be moved in accordance with a desired variation, a controlled member, a variable speed driving means for said controlled member, a high ratio speed reduction irreversible mechanism interposed between said driving means and said controlled member, means for causing said driving means to drive said controlled member to a position of agreement with said controlling member, the inertia of the output system driven by said mechanism being of the order of and less than $$I_1 \rho^2 \left( \frac{\eta_0}{1 - 2\eta_0} \right)$$

the inertia of the input system feeding into said mechanism being greater than $$\frac{I_2}{\rho^2} \left( \frac{1 - 2\eta_0}{\eta_0} \right)$$

where $I_1$ is the inertia of said input system, $I_2$ is the inertia of said output system, $\rho$ is the ratio of the driving speed to the driven speed of said mechanism, and $\eta_0$ is the efficiency of said mechanism at a minimum speed approaching zero speed under sustained load, the stiffness of said input and output systems being such that $$\sqrt{\frac{K_1}{I_1}}$$

is much greater than $$\sqrt{\frac{K_2}{I_2}}$$

where $K_1$ and $K_2$ are the stiffness factors respectively of said input and output systems.

JOHN W. DAWSON.

REFERENCES CITED

The following references are of record in the file of this patent:

UNITED STATES PATENTS

| Number | Name | Date |
|---|---|---|
| Re. 16,667 | Hewlett et al. | July 5, 1927 |
| 1,554,698 | Alexanderson | Sept. 22, 1925 |
| 1,684,138 | Nixdorff | Sept. 11, 1928 |
| 1,847,181 | Harrison | Mar. 1, 1932 |
| 1,922,759 | Davis | Aug. 15, 1933 |